2,864,129

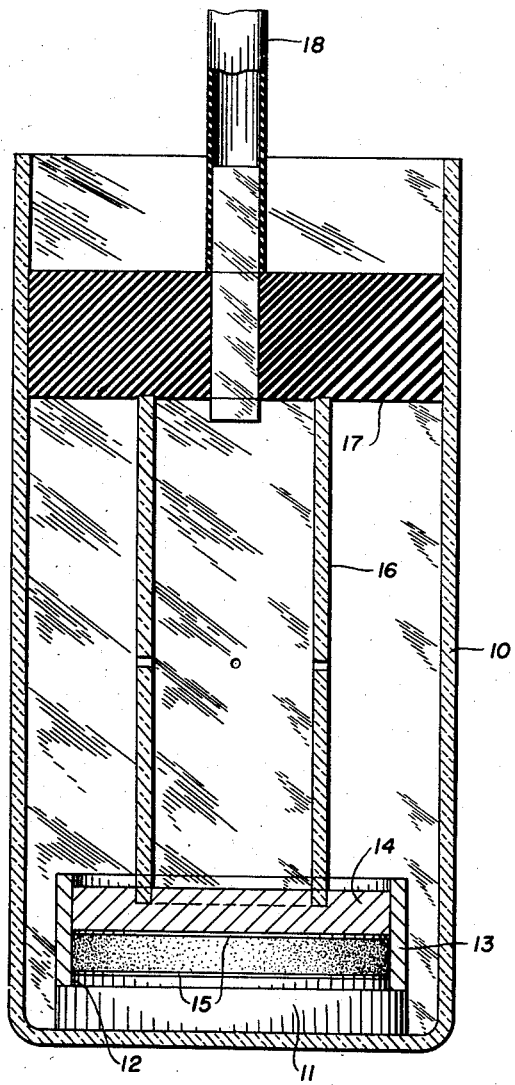
Frederick R. Eirich,
Sidney L. Reegen &
Daniel I. Livingston
INVENTORS.

PROCESS FOR THE PREPARATION OF ABRASIVE ARTICLES

Frederick R. Eirich, Eastchester, N. Y., Daniel I. Livingston, Cambridge, Mass., and Sidney L. Reegen, Euclid, Ohio, assignors to Polytechnic Institute of Brooklyn, a chartered institution Application August 25, 1953, Serial No. 376,342

6 Claims. (Cl. 18—47.5)

The present invention relates to an improved process and related apparatus for the manufacture of abrasive articles, such, for example, as grinding or cutting wheels and other surfacing tools of a similar nature. More particularly, the invention contemplates the provision of a process for the manufacture or fabrication of abrasive articles employing new and improved resinous binders.

The general characteristics and physical properties which are most desired in materials intended for use as binders in the manufacture of abrasive articles are the following:

(1) The binder should possess high mechanical strength, i. e., resistance to chipping or breaking over extended periods of use;

(2) It should be capable of retaining its normal physical properties without melting or decomposition at temperatures up to about 300° C.;

(3) It should have a high resistance to attrition, that is to say, the tendency of the binder to diffuse into the material being worked;

(4) It should possess some degree of flexibility with respect to control of hardness, as denoting the measure of resistance the binder offers to the release of abrasive particles or the freedom with which the particles may be torn from the bond upon dulling;

(5) It should be capable of adjustment or control with respect to distribution of the abrasive particles to provide dense or open structural characteristics; and (6) It should be substantially inert or non-reactive to the standard coolants or lubricants employed in grinding operations.

Of the various materials heretofore customarily employed in the manufacture of abrasive articles, including vitrified or ceramic materials, natural gums and rosins, shellac, rubber, silicate of soda, oxychloride of magnesium and the resinoid or synthetic resins; the vitrified binders are by far most ideally suited to the above-enumerated requirements. The vitrified binders as well as the silicate and oxychloride types are, however, subject to one very great disadvantage limiting their field of application to relatively heavy slow speed grinding operations in that, they are relatively rigid or brittle and must be handled with a degree of care not possible in many installations and applications. Furthermore, they require the use of special kilns and curing processes during their manufacture which are undesirable from an economical standpoint. The rubber, shellac, natural gums and rosins are elastic in character thereby overcoming the principal disadvantage of the ceramic binders, but their field of use has been limited in the past because, for the most part, they decompose at much lower temperatures than do the ceramic binders, they are attacked by many of the standard coolants and lubricants and are relatively inflexible with respect to hardness-grading and homogeneity.

The resinoid binders which have heretofore been employed in the industry are not only subject to most of the disadvantages enumerated above with respect to the other organic binders but, in addition, they are customarily characterised by a tendency to undergo permanent molecular changes, becoming relatively rigid and brittle after repeated heating or cooling during intermittent use. On the other hand, because of the inherent resiliency and ruggedness of the resinoid binders, they are ideally suited for use in high speed grinding operations, operations in which the abrasive tool may be subject to lateral strains and impact shocks such as are frequently encountered in foundry work, and for applications requiring portability of the grinding tool. Accordingly, there is need in the industry for improved binders of the resinoid type and for methods and procedures whereby these binders may be employed in the manufacture of abrasive articles which combine increased mechanical strength and high heat resistant properties with toughness and resistance to becoming embrittled, and which may be subject to control during their manufacture to provide for variations in hardness-grading and homogeneity.

In copending U. S. application Serial No. 376,517 of Frederick R. Eirich entitled, "Dibasic Acid-Polyhydric Alcohol Synthetic Resin and Method of Its Production," which was filed of even date with this application, there are described new and improved resins of the thermo-setting type which are admirably suited for use as binders in the manufacture of abrasive articles.

It is the principal object of the present invention to provide methods and procedures for the manufacture of abrasive articles employing the improved resins of the aforementioned application.

A specific object of the invention is to produce new and improved resinoid bound abrasives which are not subject to the disadvantages and limitations of similarly bound abrasives heretofore known in the industry.

The above and other objects and advantages of the invention will become more apparent and the invention itself may be best understood from a consideration of the following detailed description of specific embodiments thereof taken in conjunction with the accompanying drawing, wherein:

Fig. 1 is a elevation view of a form of apparatus suitable for use in the manufacture of abradants according to the present invention.

The synthetic resins of copending application No. 376,517 are produced by effecting a polycondensation reaction between select esters of dibasic acids and certain polyhydroxy alcohols and incorporating into the reaction product polyglycol plasticizing agents. The resulting synthetic resins may be defined in more detail as comprising a condensation product of (1) a dibasic acid ester having the formula:

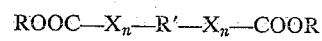
ROOC—$X_n$—R'—$X_n$—COOR wherein R is the radical of an alcohol having not more than 6 carbon atoms, R' is a ring member selected from the group consisting of benzene, naphthalene, and pyridine rings, X is a lower alkyl radical, and $n$ is one of the integers 0 and 1; and wherein the —XCOOR groups are attached to the R' ring at positions having a para relationship to each other;

(2) a branched chain polyhydroxy alcohol containing carbon chain members of not more than 6 carbon length and (3) a plasticizer of the group consisting of polyalkylene glycols and alkoxy polyalkylene glycols.

The above-defined condensation products relate in a broad sense to that class of products which are designated as terylenes and which are produced by condensation of polyesters of terephthalic and ethyleneglycol or higher glycols. The properties of these particular terylenes may be varied widely by variations introduced through the basic constituents, dibasic acid and dihydroxy alcohol. In general, it has been found that the paradicarboxylic acids induce an increased degree of crystallization and therefore impart greater strength to the resins but at the same time they tend to raise the melting point, increase brittleness and render working more difficult. In a similar manner, the nature of the glycol enhances either crystallinity and hardness or flexibility according to its constituent. In accordance with the process of the aforementioned copending application, a resin having the desired physical properties, is obtained by effecting a cross linked terylene using, for example, a terephthalic acid derivative or other dibasic acid derivative wherein the acid groups are attached to diametrical or non-adjacent carbon atoms and by condensing it with branched chain polyhydroxy alcohols containing not more than four hydroxyl groups as, for example, pentaerythritol. It was found that simple cross linking raised the hardness and softening temperature of the resin, but at the same time increased brittleness. In overcoming this effect, it was found that plasticization could be produced by incorporating low polymer polyglycols such as polyalkyleneglycols and alkoxypolyalkyleneglycols along with the polyhydroxy alcohol in the condensation reaction mixture. The resulting products permit the realization of several unique properties by means of a structural plasticization in which some of the plasticizer forms a part of the plastic structure through a single stage cross linkage of the components. Thus, owing to the poly functioning grouping, cross linking is obtained between the long polymer chains with the polyglycol plasticizer participating in the reaction and terminating a number of polymer chains, thereby creating long flexible tails between dibasic acid resin molecules. In this manner there is achieved such a distribution of short rigid links and more flexible ends that the material retains the characteristics of a largely crystalline substance which exhibits little or no softening prior to its actual melting point, retaining its mechanical strength at temperatures up to 330° C.

In adapting the resins of copending application No. 376,517 for use in the manufacture of abrasives the dibasic acid ester and the branched chain polyhydroxy alcohol are mixed in an open vessel maintained in a constant temperature bath and the polyalkylene glycol is added to the mixture in an amount equivalent to the polyhydroxy alcohol constituent on a weight basis. A condensation catalyst such as lead dioxide may be added to the reaction mixture at this time if desired to speed the curing and polymerization. The mixture is then heated relatively slowly to approximately the melting point of the dibasic acid ester or to a temperature in the range 160° C.–230° C., at which temperature the alcohol constituent of the dibasic acid ester begins to pass off. The temperature is maintained at approximately the melting point until the alcohol ceases to escape.

At the end of this first period, the reaction mixture reaches a very high degree of viscosity sufficient, in fact, to slow down the rate of escape of the alcohol constituent of the dibasic acid ester quite noticeably. The material at this stage may be removed from the bath, chilled and kept indefinitely for compounding purposes. Unlike most known synthetic resins which during intermediate stages of polymerization and curing are of a cheese-like or curd consistency that does not lend itself to working or compounding, the resins of the aforementioned application are characterized by their ability to pass through a well-defined putty or dough-like stage of consistency and may be worked, shaped or compounded readily at temperatures of about 10° below room temperature. This unique property of the resins is of particular importance in the manufacture of abrasives since it provides for ease in compounding the binder and abrasive and insures a homogeneous mixture which can be regulated to provide open or dense structural characteristics.

In compounding the product of the initial heat treatment with the abrasive substance, we prefer to roll or knead the particles into the binder, employing abrasive particles of uniform screen size. The binder may be compounded with any of the known abrasives including aluminum oxide, silicon carbide, emery, corundum, sandstone, etc., and a wide range of screen sizes may be employed with equal effectiveness. It is found that by working or compounding the abrasive particles with the resin at a temperature of about 10° C., the particles will be distributed uniformly throughout the mass and held in position for curing without any tendency to redistribute themselves or to settle-out as might be expected by reason of their relatively greater density.

In molding and curing the compounded resin and abrasive, we prefer to employ a special curing chamber of the type illustrated in Fig. 1 of the drawing, as it is found to be admirably suited for high pressure operations and for ease in separating the finished specimen after curing. With reference to Fig. 1, the curing chamber comprises an outer cylindrical chamber 10 which may be formed of Pyrex glass or other suitable material provided with a flat base and filleted corners for added strength under vacuum. The molding elements themselves, which in the embodiment illustrated are intended for use in the manufacture of a wheel-type abrasive, consist of a base disc 11 which may be formed of brass or other suitable material positioned on the bottom of chamber 10 and provided with an annular recess 12 around its circumference for receiving ring member 13 which constitutes the side of the mold. A cover disc 14 is adapted to be received within ring member 13 to complete the wheel type mold. Cover disc 14 may also be formed of brass or it may be of glass to permit vision into the mold. Both the lower surface of cover disc 14 and the upper surface of base disc 11 are provided with insulating discs 15, preferably formed of mica, which prevent the compounded resin mixture from adhering to the mold members 11 and 14. To further safeguard against adhesion of the binder to the mold elements, a thin film of silicone oil may be applied to all surfaces. The upper surface of cover disc 14 is recessed to receive an inner cylindrical chamber 16 which functions in cooperation with rubber piston 17 inserted within chambers 10 to seal the system and to exert molding pressure onto the mold parts when the system is evacuated. Piston 17 is provided with an exhaust tubing 18 which may be connected to any suitable vacuum equipment. When vacuum is applied to the system, rubber piston 17 will be forced inwardly into chamber 10 until it contacts the top of the inner chamber 16 which acts against cover disc 14 to apply uniform pressure to the specimen in the mold.

The compounded mixture of resin and abrasive particles is placed inside the mold members within chamber 10 and the entire unit is then submerged in a metal bath maintained at a temperature of about 180° C. and heated for a time sufficient to permit the mixture to become fluid enough to distribute itself evenly within the mold. The temperature is then increased to about 220–230° C. and maintained for 3 to 4 hours at which time the system is placed under reduced pressure to permit the reaction to go to completion which occurs within about 2 to 3 hours. The chamber 10 is then removed from the heated bath and allowed to cool to nearly room temperature while still under pressure.

After the specimen has been removed from the mold it may be worked or machined as required, such, for example, to provide bushings or axle shafts for the wheel type of abrasive illustrated in the drawing.

It has been found that the compounded mixture of resin and abrasive particles, when molded and cured as described above, provide abrasive products which are substantially inert to all standard coolants and lubricants which are presently employed in the grinding industry. These coolants and lubricants include sodium carbonate solutions, soap solutions, soluble oils or emulsions of the mineral oils.

While we have described our invention with respect to specific embodiments, variations and modifications in procedure should be readily apparent to one skilled in the art and it is to be understood that the invention is not limited to the details disclosed but includes all such variations and modifications as fall within the spirit of the invention and the scope of the appended claims.

This application is a continuation in part of U. S. application Serial No. 112,174 of August 24, 1949 (now abandoned).

What is claimed is:

1. The process for producing abrasive articles which comprises heating a mixture of a finely divided abrasive substance and a condensation product of (1) a dibasic acid ester having the formula $$ROOC-X_n-R'-X_n-COOR$$

wherein R is the radical of an alcohol having not more than 6 carbon atoms, R' is a ring member selected from the group consisting of benzene, naphthalene, and pyridine rings, X is a lower alkyl radical, and $n$ is one of the integers 0 and 1; and wherein the —XCOOR groups are attached to the R' ring at positions having a para relationship to each other; (2) a branched chain polyhydroxy alcohol containing carbon chain members of not more than 6 carbon length and (3) a plasticizer of the group consisting of polyalkylene glycols and alkoxy polyalkylene glycols in a mold of the desired configuration to a temperature of about 180° C. until the mixture distributes itself evenly in the mold, raising and maintaining the temperature to a temperature within the range 220° C. to 230° C. for about three to four hours, placing the mixture under pressure within the mold and continuing the heating for an additional two to three hours and removing the mold from the heating zone and permitting it to cool gradually to room temperature.

2. The process for producing abrasive articles which comprises compounding a finely divided abrasive substance with a condensation product of (1) a dibasic acid ester having the formula $$ROOC-X_n-R'-X_n-COOR$$

wherein R is the radical of an alcohol having not more than 6 carbon atoms, R' is a ring member selected from the group consisting of benzene, naphtholene, and pyridine rings, X is a lower alkyl radical, and $n$ is one of the integers 0 and 1; and wherein the —XCOOR groups are attached to the R' ring at positions having a para relationship to each other; (2) a branched chain polyhydroxy alcohol containing carbon chain members of not more than 6 carbon length and (3) a plasticizer of the group consisting of polyalkylene glycols and alkoxy polyalkylene glycols at a temperature of about 10° C., heating the compounded mixture in a mold of the desired configuration within a metal bath to a temperature of about 180° C. to distribute the mixture within the mold, raising and maintaining the temperature of the metal bath to a temperature within the range 220° C. to 230° C. for three to four hours, placing the mixture within the mold under pressure and continuing the heating for two to three hours and removing the mold from the metal bath and permitting the molten specimen to cool gradually to room temperature.

3. The process of manufacturing abrasive articles which comprises compounding a finely divided abrasive substance with a resinoid binder consisting of a condensation product of diethyl terephthalate, pentaerythritol and polyethylene glycol by kneading at a temperature of about 10° C., molding the compounded mixture within a suitable mold at an elevated temperature for three to four hours, placing the compounded mixture under pressure within the mold and maintaining the elevated temperature for an additional two or three hours and removing the specimen from the mold and permitting it to cool gradually to room temperature.

4. The process for producing abrasive articles which comprises forming a binder by mixing (1) a dibasic acid ester having the formula $$ROOC-X_n-R'-X_n-COOR$$

wherein R is the radical of an alcohol having not more than 6 carbon atoms, R' is a ring member selected from the group consisting of benzene, naphtholene, and pyridine rings, X is a lower alkyl radical, and $n$ is one of the integers 0 and 1; and wherein the —XCOOR groups are attached to the R' ring at positions having a para relationship to each other; (2) a branched chain polyhydroxy alcohol containing carbon chain members of not more than 6 carbon length and (3) a plasticizer of the group consisting of polyalkylene glycols and alkoxy polyalkylene glycols, components (1) and (2) being employed in approximately equivalent proportions, heating the mixture relatively slowly to approximately the melting point of the dibasic acid ester constituent in the presence of a small amount of a condensation catalyst to effect condensation of the components, removing the resulting condensation product from the heating zone and cooling it to a temperature of approximately 10° C., compounding the condensation product with a finely divided abrasive substance, molding the compounded mixture within a suitable mold at an elevated temperature for three to four hours, placing the compounded mixture under pressure within the mold and maintaining the elevated temperature for an additional two to three hours and removing the specimen from the mold and permitting it to cool gradually to room temperature.

5. The process for producing abrasive articles which comprises forming a resinous binder by mixing (1) a dibasic acid ester having the formula $$ROOC-X_n-R'-X_n-COOR$$

wherein R is the radical of an alcohol having not more than 6 carbon atoms, R' is a ring member selected from the group consisting of benzene, naphtholene, and pyridine rings, X is a lower alkyl radical, and $n$ is one of the integers 0 and 1; and wherein the —XCOOR groups are attached to the R' ring at positions having a para relationship to each other; (2) a branched chain polyhydroxy alcohol containing carbon chain members of not more than 6 carbon length and (3) a plasticizer of the group consisting of polyalkylene glycols and alkoxy polyalkylene glycols, constituents (1) and (2) being employed in amounts approximately equivalent on a weight basis, heating the mixture relatively slowly to a temperature in the range 160°–230° C., cooling the resulting condensation product to a temperature of 10° C. and compounding it with a finely divided abrasive substance, molding the compounded mixture within a suitable mold at an elevated temperature for three to four hours, placing the mixture under pressure within the mold and maintaining the elevated temperature for an additional two to three hours and removing the specimen from the mold and permitting it to cool gradually to room temperature.

6. The process for producing abrasive articles which comprises forming a resinous binder by mixing (1) a dibasic acid ester having the formula $$ROOC-X_n-R'-X_n-COOR$$

wherein R is the radical of an alcohol having not more than 6 carbon atoms, R' is a ring member selected from the group consisting of benzene, naphtholene, an,d pyridine rings, X is a lower alkyl radical, and $n$ is one of the integers 0 and 1; and wherein the —XCOOR groups are attached to the R' ring at positions having a para relationship to each other; (2) a branched chain polyhydroxy alcohol containing carbon chain members of not more than 6 carbon length and (3) a plasticizer of the group consisting of polyalkylene glycols and alkoxy polyalkylene glycols, constituents (1) and (2) being employed in amounts approximately equivalent on a weight basis, heating the mixture relatively slowly to a temperature in the range 160°–230° C., cooling the resulting condensation product to a temperature of 10° C. and compounding it with a finely divided abrasive substance, heating the compounded mixture in a mold of the desired configuration to a temperature of about 180° C. until the mixture distributes itself evenly within the mold, raising and maintaining the temperature to a temperature within the range 220° C. to 230° C. for about three to four hours, placing the mixture under pressure within the mold and continuing the heating for an additional two to three hours and removing the mold from the heating zone and permitting it to cool gradually to room temperature.

References Cited in the file of this patent

UNITED STATES PATENTS

| | | |
|---|---|---|
| 1,864,909 | Jaeger | June 28, 1932 |
| 1,980,151 | Barrington | Nov. 6, 1934 |
| 1,981,970 | Sanford | Nov. 27, 1934 |
| 2,085,959 | Donegan | July 6, 1937 |
| 2,238,443 | Fields | Apr. 15, 1941 |
| 2,437,046 | Rothrock et al. | Mar. 2, 1948 |
| 2,465,319 | Whinfield | Mar. 22, 1949 |
| 2,495,640 | Muskat et al. | Jan. 24, 1950 |
| 2,509,652 | Rushmer et al. | May 30, 1950 |
| 2,525,664 | Gadsby et al. | Oct. 10, 1950 |
| 2,566,199 | Hiatt et al. | Aug. 28, 1951 |
| 2,589,652 | Allison | Mar. 18, 1952 |